US009756044B2

(12) United States Patent
Chai et al.

(10) Patent No.: US 9,756,044 B2
(45) Date of Patent: Sep. 5, 2017

(54) ESTABLISHMENT OF COMMUNICATION CONNECTION BETWEEN MOBILE DEVICE AND SECURE ELEMENT

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Yu Zhou, Shanghai (CN); Wei Guo, Shanghai (CN); Dingzhou Li, Shanghai (CN)

(73) Assignee: CHINA UNIONPAY CO., LTD, Shanghai (CN)

( * ) Notice: Subject to any disclaimer, the term of this patent is extended or adjusted under 35 U.S.C. 154(b) by 0 days.

(21) Appl. No.: 14/787,193

(22) PCT Filed: Apr. 30, 2014

(86) PCT No.: PCT/CN2014/076589
§ 371 (c)(1),
(2) Date: Oct. 26, 2015

(87) PCT Pub. No.: WO2014/177055
PCT Pub. Date: Nov. 6, 2014

(65) Prior Publication Data
US 2016/0119334 A1    Apr. 28, 2016

(30) Foreign Application Priority Data
May 3, 2013  (CN) .......................... 2013 1 0159769

(51) Int. Cl.
*H04L 29/06*    (2006.01)
*H04W 12/06*    (2009.01)
*H04W 88/02*    (2009.01)

(52) U.S. Cl.
CPC ...... *H04L 63/0853* (2013.01); *H04L 63/0869* (2013.01); *H04W 12/06* (2013.01); *H04W 88/02* (2013.01)

(58) Field of Classification Search
USPC ....................................... 726/3; 713/168, 170
See application file for complete search history.

(56) References Cited

U.S. PATENT DOCUMENTS

2007/0083760 A1* 4/2007 Cho .................. G06F 21/572
                                                        713/168
2008/0305769 A1   12/2008 Rubinstein
(Continued)

FOREIGN PATENT DOCUMENTS

| CN | 102404711 A | 4/2012 |
| CN | 102469452 A | 5/2012 |
| CN | 102609740 A | 7/2012 |

OTHER PUBLICATIONS

"SIA: Secure Information Aggregation in Sensor Networks"; Przydatek et al; Proceedings of the 1st international conference on Embedded networked sensor systems; 2003, 12 pages.*
(Continued)

*Primary Examiner* — Jason Lee
(74) *Attorney, Agent, or Firm* — The Ollila Law Group LLC (57) ABSTRACT

The invention relates to communication technology, and in particular, to a method of establishing communication connection between a mobile device and a secure element as well as a mobile device for implementing the method. The method comprises the following steps: when the mobile device detects that there is a secure element which establishes a physical connection with it, the mobile device performs a secure authentication on the secure element; if the secure authentication passes, the mobile device determines whether there is configuration information inside it
(Continued)

which is required for establishing the communication connection between the mobile device and the secure element; and if there is the required configuration information inside the mobile device, the mobile device uses the configuration information to establish the communication connection with the secure element; otherwise, the mobile device obtains required configuration information from the secure element to establish the communication connection with the secure element.

14 Claims, 4 Drawing Sheets

(56) References Cited

U.S. PATENT DOCUMENTS

| | | |
|---|---|---|
| 2009/0177716 A1 | 7/2009 | Bertin |
| 2012/0079048 A1* | 3/2012 | Chen ..................... H04W 4/14 |
| | | 709/206 |
| 2012/0304281 A1 | 11/2012 | Kang et al. |
| 2014/0157381 A1* | 6/2014 | Disraeli ................ G06F 21/31 |
| | | 726/7 |

OTHER PUBLICATIONS

"Smart Cards; Secure channel between a UICC and an end-point terminal (Release 11)", Technical Specification, European Telecommunications Standards Institute (etsi), 650, Route Des Lucioles; F-06921 Sophia-Antipolis; France, vol. SCP TEC, No. V11.0.0, Sep. 1, 2012 (Sep. 1, 2012), XP014075031.

* cited by examiner

ESTABLISHMENT OF COMMUNICATION CONNECTION BETWEEN MOBILE DEVICE AND SECURE ELEMENT

FIELD OF THE INVENTION

The invention relates to communication technology, and in particular, to a method of establishing communication connection between a mobile device and a secure element as well as a mobile device for implementing the method.

BACKGROUND

With rapid development of wideband wireless access technology and mobile terminal technology, the mobile internet has emerged as the time requires and is becoming the fastest growing, the most potential and the most promising marker. Businesses based on mobile internet are penetrating into various aspects of our daily lives such as social intercourse, shopping, financial transaction, livelihood information acquisition, etc. Some mobile internet businesses relate to storing, reading and transmitting of sensitive information (e.g., user's privacy, log-in ID, password, etc), and therefore, a secure mechanism is required to be provided so as to provide protection.

By providing a secure element (SE) which is independent from the mobile device in both physical and logic functions, a secure protection can be provided for the sensitive information. By "secure element", it means an independent hardware unit having computing and storing functions, which on one hand configures a secure function to protect the safety of the stored data, and on the other hand also provides an invokable secure mechanism service to an external device. Examples of secure element include but are not limited to SIM card, intelligent SD card, USB encrypted lock, etc.

During the process in which the mobile device establishes communication connection with the secure element, it is often required to know the configuration information of the secure element. The configuration information for example includes but is not limited to identifier, capacity, display icon, in-built application list, etc. For this reason, the configuration information can be obtained through an interaction between the mobile device and the secure element. However, as the types of the mobile device and secure element are becoming increasingly diverse, the process of establishing communication connection between them is becoming more and more complicated. Therefore, how to optimize this process has become a problem that needs to be addressed urgently.

SUMMARY OF THE INVENTION

An object of the invention is to provide a method of establishing communication connection between a mobile device and a secure element, which has such advantages of being highly efficient and simple.

The method of establishing communication connection between a mobile device and a secure element according to an embodiment of the invention comprises the following steps:

when the mobile device detects that there is a secure element which establishes a physical connection with it, the mobile device performs a secure authentication on the secure element;

if the secure authentication passes, the mobile device determines whether there is configuration information inside it which is required for establishing the communication connection between the mobile device and the secure element; and if there is the required configuration information inside the mobile device, the mobile device uses the configuration information to establish the communication connection with the secure element; otherwise, the mobile device obtains required configuration information from the secure element to establish the communication connection with the secure element.

Preferably, in the above method, the secure element establishes the physical connection with the mobile device in a contact-less manner.

Preferably, in the above method, the mobile device performs the secure authentication on the secure element in the following manner:

sending randomly generated authentication information to the secure element;

determining whether the secure authentication passes by verifying a verification code received from the secure element, wherein the verification code is generated according to the authentication information.

Preferably, the secure element generates the verification code in the following manner: using a secret key shared by a secure authentication unit and the secure element to conduct an encrypting operation on the authentication information for one or more times, wherein the number of times of the encrypting operation has a correspondence to the count values of counters in the secure authentication unit and the secure element, and the mobile device verifies the verification code in the following manner: using the shared secret key to conduct a decrypting operation on the verification code for one or more times and determine whether the decrypted result matches with the authentication information, wherein the number of times of the decrypting operation is the same as the number of times of the encrypting operation.

Alternatively and preferably, the secure element generates the verification code in the following manner: using the secret key shared by the secure authentication unit and the secure element to conduct the encrypting operation on the authentication information for one or more times, wherein the number of times of the encrypting operation has a correspondence to the count values of counters in the secure authentication unit and the secure element, and the mobile device verifies the verification code in the following manner: using the shared secret key to conduct the encrypting operation on the authentication information in the same manner as the secure element, and determining whether the encrypted result matches with the verification code.

The method of establishing communication connection between a mobile device and a secure element according to another embodiment of the invention comprises the following steps:

when the mobile device establishes a physical connection with the secure element, the mobile device and the secure element perform secure authentications with each other;

if both the secure authentications are passed, the mobile device determines whether there is configuration information inside it which is required for establishing the communication connection between the mobile device and the secure element; and if there is the required configuration information inside the mobile device, the mobile device uses the configuration information to establish the communication connection with the secure element; otherwise, the mobile device obtains the required configuration information from the secure element to establish the communication connection with the secure element.

Preferably, in the above method, the mobile device and the secure element perform secure authentications with each other in the following manner:

the mobile device and the secure element sending randomly generated authentication information to each other;

determining whether the secure authentications are passed by verifying a verification code received from each other, wherein the mobile device and the secure element generate corresponding verification codes according to respective received authentication information.

Preferably, either one of the mobile device and the secure element generates the verification codes in the following manner: using a secret key shared by the secure authentication unit and the secure element to conduct an encrypting operation on the authentication information sent from the other one of the mobile device and the secure element for one or more times, wherein the number of times of the encrypting operation has a correspondence to the count values of counters in the secure authentication unit and the secure element, and either one of the mobile device and the secure element verifies the received verification codes in the following manner: using the shared secret key to conduct a decrypting operation on the verification code received from the other one of the mobile device and the secure element for one or more times and determine whether the decrypted result matches with the authentication information sent to said other one, wherein the number of times of the decrypting operation is the same as the number of times of the encrypting operation conducted on the verification code by said other one.

Alternatively and preferably, either one of the mobile device and the secure element generates the verification codes in the following manner: using the secret key shared by the secure authentication unit and the secure element to conduct the encrypting operation on the authentication information sent from the other one of the secure authentication unit and the secure element for one or more times, wherein the number of times of the encrypting operation has a correspondence to the count values of counters in the secure authentication unit and the secure element, and either one of the mobile device and the secure element verifies the received verification codes in the following manner: using the shared secret key to conduct the encrypting operation on the authentication information sent to the other one of the mobile device and the secure element in the same manner as said other one, and determining whether the encrypted result matches with the verification code received from said other one.

Further another object of the invention is to provide a mobile device which can establish communication connection with a secure element in an efficient and simple manner.

The mobile device according to another embodiment of the invention comprises:

a control unit configured to establish communication connection with a secure element using configuration information of the secure element;

a secure authentication unit coupled with the control unit and configured to perform secure authentication on the secure element which has established a physical connection with the mobile device, according to an instruction from the control unit; and a secure element registering machine coupled with the control unit and configured to, for the secure element which has passed the secure authentication, determine whether configuration information required for establishing the communication connection with the secure element already exists in the secure element registering machine, according to an instruction from the control unit; and if the configuration information exists, the configuration information is provided to the control unit, and if not, the configuration information provided by the secure element is stored.

BRIEF DESCRIPTION OF THE DRAWINGS

The above and other objects and advantages of the invention will be more fully clear from a detailed description given below with reference to the accompanying drawings.

DETAILED DESCRIPTION OF THE INVENTION

The invention will be explained below by describing specific embodiments with reference to the accompanying drawings. Nevertheless, it is understood that the these specific embodiments are merely exemplary and do not limit the spirit and scope of protection of the invention in any way.

In the specification, such terms as "contain" and "comprise" means that in addition to the units and steps that are described directly and explicitly in the specification and claims, the technical solutions of the invention do not exclude the circumstances involving other units and steps that have not been described directly or explicitly. Moreover, such terms as "first", "second", "third" and "fourth" do not represent the order of units or values in terms of time, space, size, etc.; rather, they are used merely for the purpose of distinguishing between individual units or values.

According to an embodiment of the invention, a secure element registering machine is provided in the mobile device for storing configuration information acquired during an interaction with a secure element, whereby when the mobile device establishes communication connection with the secure element in the future, the stored configuration information can be invoked directly so that the process of establishing communication connection is simplified, thus improving efficiency.

Figure 1:
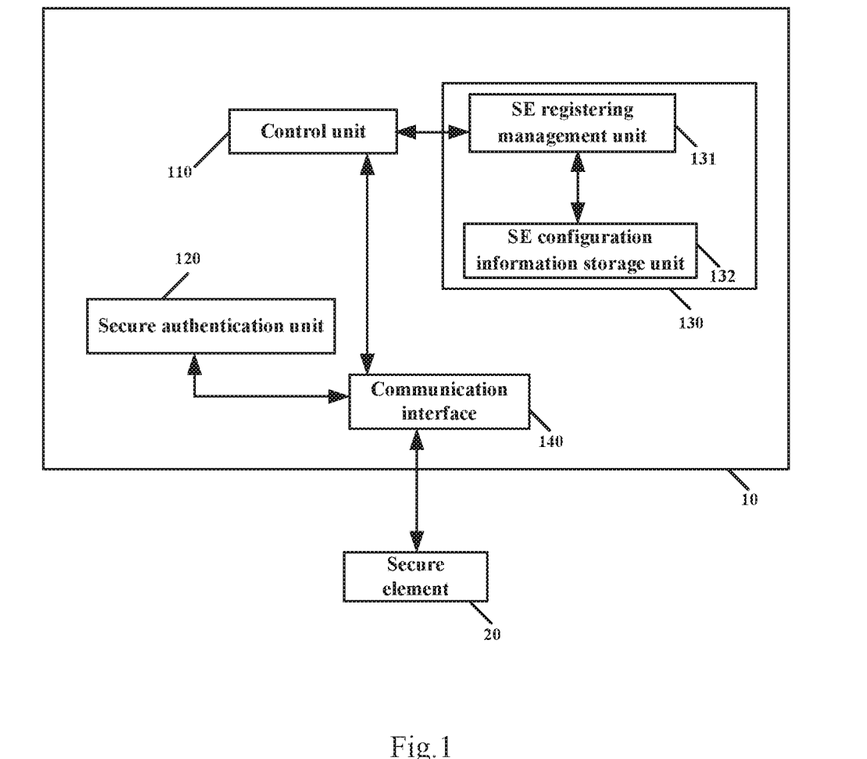
FIG. 1 is a framework view of a mobile device according to an embodiment of the invention.

FIG. 1 is a framework view of a mobile device according to an embodiment of the invention.

As shown in FIG. 1, the mobile device 10 of this embodiment comprises a control unit 110, a secure authentication unit 120, a secure element registering machine 130 and a communication interface 140, wherein control unit 110 is coupled with the secure authentication unit 120, the secure element registering machine 130 and the communication interface 140, and the secure authentication unit 120 is coupled with the communication interface 140.

It is noted that the secure authentication unit and the secure element registering machine herein can be independent hardware modules, or can be programs that are adapted to run on a processor of the control unit 110.

After the mobile device 10 establishes a physical connection with the secure element 20 via the communication interface 140, the control unit 110 instructs the secure authentication unit 120 to conduct a secure authentication to be further described below so as to determine whether the identity of the secure element is legitimate or valid. Preferably, the encrypting and decrypting operations or the like of secure authentication are all performed inside the secure authentication unit 120, and sensitive data involved are all presented in a form of ciphertext outside the secure authentication unit 120. Herein, the so-called physical connection refers to a connection realized between different devices (e.g., the mobile device 10 and the secure element 20) by means of physical medium for achieving transmission of electrical signals between the different devices. The physical medium for example includes but are is limited to wireless channel, optic fiber, cable or wiring.

With reference to FIG. 1, the secure element registering machine 130 comprises a secure element registering management unit 131 and a secure element configuration information storage unit 132. For a secure element that has passed the secure authentication, the control unit 110 forwards a corresponding identifier to the secure element registering management unit 131 and instructs the secure element registering management unit 131 to initiate a registering identification and management process. In response, the secure element registering management unit 131 looks up in a connection record list inside it to find out whether there is a record of the secure element identifier. If there is a record of the secure element identifier, the secure element registering management unit 131 will access the secure element configuration information storage unit 132 so as to acquire corresponding configuration information (e.g., the capacity of the secure element, display icon and in-built application list, etc) and provides the corresponding configuration information to the control unit 110. If there is no corresponding record or the acquisition of configuration information has failed, the secure element registering management unit 131 will return a message to the control unit 110 which indicates whether it is the first time that the secure element establishes the connection or indicates the failure of acquisition of configuration information. When the control unit 110 receives the message that indicates it is the first time that the secure element establishes the connection or indicates the failure of acquisition of configuration information, it initiates an interaction process with the secure element so as to acquire the configuration information, and forwards the acquired configuration information to the secure element registering machine 130. Subsequently, the secure element registering management unit 131 stores the received configuration information in the secure element configuration information storage unit 132.

Figure 2:
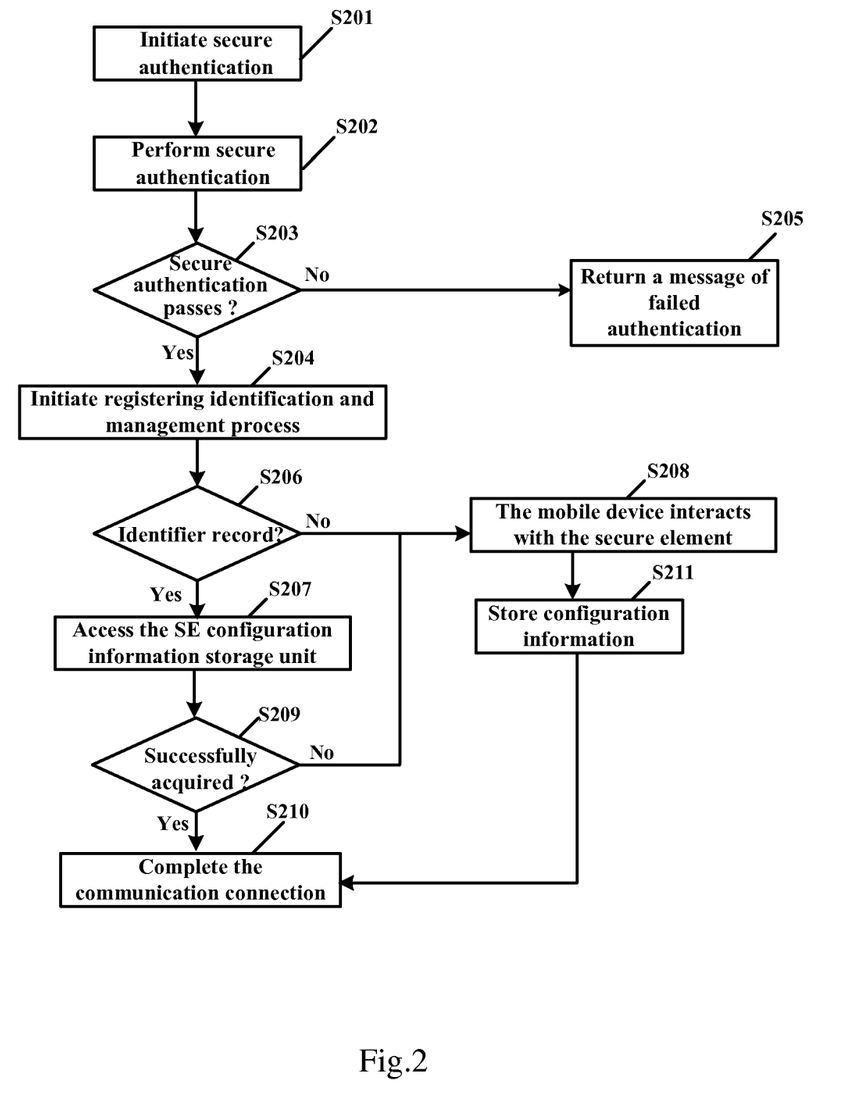
FIG. 2 is flowchart of a method for establishing communication connection between a mobile device and a secure element according to another embodiment of the invention.

FIG. 2 is flowchart of a method for establishing communication connection between a mobile device and a secure element according to another embodiment of the invention. By way of example, it is assumed herein that the mobile device employs the framework shown in FIG. 1. However, it will be recognized from the following description that the method of this embodiment is not dependent on a particular framework.

As shown in FIG. 2, at step S201, in response to an event of the secure element 20 establishing a physical connection with the mobile device, the control unit 110 of the mobile device 10 instructs the secure authentication unit 120 to initiate a secure authentication process of the secure element 20.

Next, step S202 is executed, in which the secure authentication unit 120 performs a secure authentication on the secure element 20 and returns the authentication result to the control unit 110.

At step 203, if the control unit 110 receives a message from the secure authentication unit 120 which indicates that the secure authentication passes, step S204 is executed, and the control unit 110 forwards the identifier of the secure element 20 to the secure element registering management unit 131 and instructs the secure element registering management unit 131 to initiate a registering identification and management process; otherwise, step S205 is executed, and the control unit 110 instructs an output device to output a message which indicates that the authentication is not passed (e.g., displaying a prompt message of authentication failure on the display of the mobile device).

After step S204 is completed, step S206 is executed, in which the secure element registering management unit 131 determines whether there is a record of corresponding identifier by looking up a connection record list; if there is, the step S207 is executed;

otherwise, the identifier of the secure element 20 is recorded in the connection record list and then step S208 is executed, in which the control unit 110 initiates the interaction process between the mobile device 10 and the secure element 20.

At step S207, the secure element registering management unit 131 will access the secure element configuration information storage unit 132 to acquire corresponding configuration information. Then, step S209 is executed to determine whether the corresponding configuration information is successfully acquired. If it is successfully acquired, step S210 is executed and the control unit 110 will use the configuration information in the secure element configuration information storage unit 132 to complete the communication connection between the mobile device 10 and the secure element 20; otherwise, step S208 is executed.

After step S208, step S211 is executed, in which the secure element registering management unit 131 stores the configuration information acquired during the interaction process in the secure element configuration information storage unit 132.

After step S211, step S120 is executed, in which the control unit 110 uses the configuration information to complete the communication connection between the mobile device 10 and the secure element 20.

Figure 3:
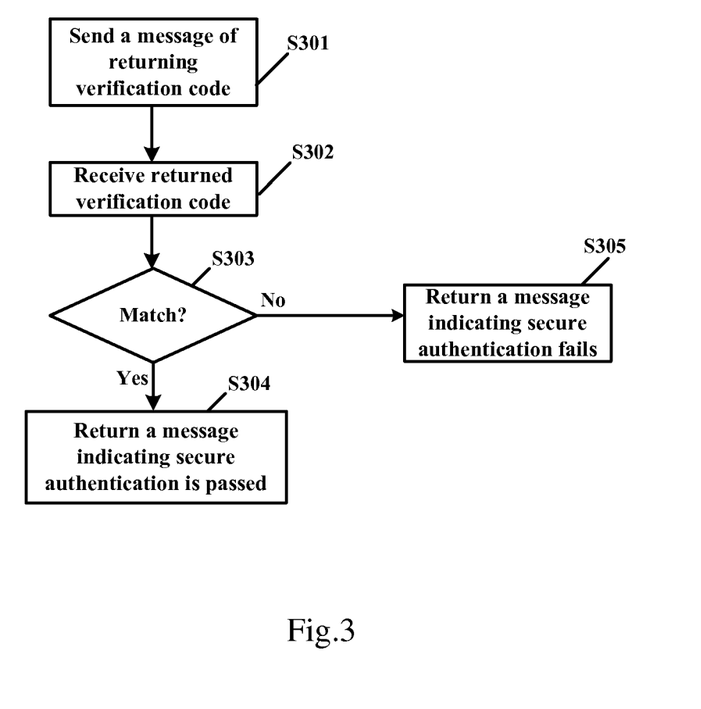
FIG. 3 shows a processing flowchart of a secure authentication used in the method shown in FIG. 2.

FIG. 3 shows a processing flowchart of a secure authentication used in the method shown in FIG. 2.

As shown in FIG. 3, at step S301, the secure authentication unit 120 sends a message of returning the verification code to the secure element 20 via the communication interface 140, which message contains authentication information (e.g., a random number) for generating the verification code.

In order to avoid replay attack, preferably, the verification code can be generated in the following manner: shared secret information (e.g., a 16-byte secret key) and counters having the same initial value can be set in the secure authentication unit 120 and the secure element 20 in advance. When the secure element 20 receives the authentication information sent by the secure authentication unit 120, the secure element 20 uses the shared secret information to conduct an encrypting operation on the authentication information for one or more times so as to generate the verification code, wherein the number of times of the encrypting operation has a correspondence to the count values of counters (e.g., the number of times of encrypting operation is the same as the count values); after the encrypting operation is completed, the secure element 20 will change the count values of counters inside it (e.g., the count value is increased by 1 or decreased by 1 each time an encrypting operation is completed) so that there will be a different number of times of encrypting operation next time the encrypting operation is performed.

Subsequently, at step S302, the secure authentication unit 120 receives the returned verification code from the secure element 20 via the communication interface 140.

At step S303, the secure authentication unit 120 uses the shared secret information to verify the received verification code. If the received verification code matches with the sent authentication information, step S304 is executed, and a message indicating that the secure authentication passes is returned to the control unit 110; otherwise, step S305 is executed, and a message indicating that the secure authentication has failed is returned to the control unit 110.

At step S303, various ways can be used to complete the verification operation. For example, the verification code can be decrypted, and a comparison is made between the authentication information obtained after decryption and the original authentication information so as to determine whether the verification code matches with the authentication information. For another example, the authentication information can be encrypted at the secure authentication unit 120 in the same way as the secure element 20 so as to obtain a local verification code, and a comparison is made between the local verification code and the received verification code to determine whether the verification code matches with the authentication information.

When the above described preferable way of encrypting is used, at step S303, the secure authentication unit 120 will conduct an decrypting operation on the received verification code for one or more time so as to obtain the authentication information by restoration, or will conduct an encrypting operation on the authentication information for one or more time so as to obtain the local verification code, wherein the number of times of the decrypting operation and the encrypting operation performed at the secure authentication unit 120 is the same as the number of times of the encrypting operation performed at secure element so that the number of times of the decrypting operation and the encrypting operation performed at the secure authentication unit 120 remains the same correspondence to the count values of the counters in the secure authentication unit 120.

When the above described preferable way of encrypting is used, in order that the counters in the secure authentication unit 120 and the counters in the secure element 20 are changed synchronously, at step S303, after the decrypting or encrypting process is completed, the secure authentication unit 120 changes the count values of the counters inside it in the same way as the secure element 20.

Figure 4:
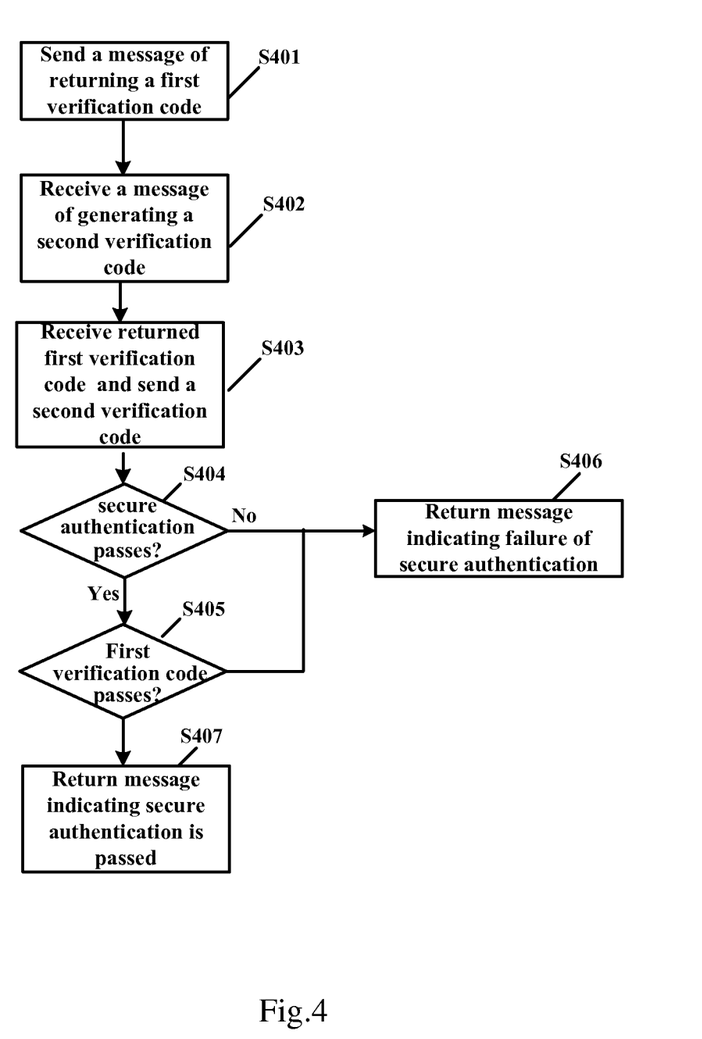
FIG. 4 shows another processing flowchart of a secure authentication used in the method shown in FIG. 2.

FIG. 4 shows another processing flowchart of a secure authentication used in the method shown in FIG. 2. As compared to the flowchart shown in FIG. 3, the present flowchart is based on a bidirectional authentication mechanism.

As shown in FIG. 4, at step S401, the secure authentication unit 120 sends a message of returning a first verification code to the secure element 20 via the communication interface 140, which message contains a first authentication information for generating the first verification code.

Subsequently, at step S402, the secure authentication unit 120 receives a message of generating a second verification code from the secure element 20, which message contains second authentication information generated by the secure element 20.

Then, step S403 is executed, in which the secure authentication unit 120 receives the returned first verification code from the secure element 20 via the communication interface 140, and sends a second verification code generated by the secure authentication unit 120 to the secure element 20.

At step S404, the secure authentication unit 120 receives an authentication result of the second verification code from the secure element 20 and determines whether the secure authentication conducted by the secure element 20 passes. If passed, step S405 will be executed; otherwise, step S406 is executed and a message indicating failure of secure authentication is returned to the control unit 110.

At step S405, the secure authentication unit 120 uses the shared secret information to verify the received first verification code. If the received first verification code matches with the sent first authentication information, step S407 is executed and a message indicating that the secure authentication passes is returned to the control unit 110; otherwise, step S406 is executed and a message indicating failure of secure authentication is returned to the control unit 110.

In the flowchart shown in FIG. 4, the generation and verification of the first and second verification codes can be performed in the way described above in the processing flowchart with reference to FIG. 3. Specifically, at the secure element 20 and the secure authentication unit 120, the received first and second authentication information are encrypted respectively using the secret information shared by the secure element 20 and the secure authentication unit 120, wherein the number of times of the encrypting operation has a correspondence to the count values of the counters which change synchronously. Correspondingly, at the secure authentication unit 120 and the secure element 20, the first and second verification codes can decrypted respectively using the shared secret information, and a comparison is made between the authentication information obtained after decryption and original authentication information to determine whether the verification codes match with the authentication information; alternatively, at the secure authentication unit 120 and the secure element 20, the first and second authentication information are encrypted using the shared secret information in the same way as each other so as to obtain a local verification code, and a comparison is made between the local verification code and the received verification code so as to determine whether the verification code matches with the authentication information.

Since the invention can be carried out in various ways without departing from the essential spirit of the invention, the specific embodiments described above are merely illustrative instead of limiting. The scope of the invention is defined by the appended claims, and various changes or modifications made to the above embodiments fall within the scope of protection defined by the appended claims.

The invention claimed is:

1. A method of establishing communication connection between a mobile device and a secure element, characterized by comprising the following steps:
   when the mobile device detects that there is a secure element which establishes a physical connection with it, the mobile device performs a secure authentication on the secure element;
   if the secure authentication passes, the mobile device determines whether there is configuration information inside it which is required for establishing the communication connection between the mobile device and the secure element; and if there is the required configuration information inside the mobile device, the mobile device uses the configuration information to establish the communication connection with the secure element; otherwise, the mobile device obtains required configuration information from the secure element to establish the communication connection with the secure element;

wherein the mobile device performs the secure authentication on the secure element in the following manner:

sending randomly generated authentication information to the secure element; and determining whether the secure authentication passes by verifying a verification code received from the secure element, wherein the verification code is generated according to the authentication information.

2. The method according to claim 1, wherein the secure element is an intelligent card or a USB encryption lock.

3. The method according to claim 1, wherein the secure element establishes the physical connection with the mobile device in a contact-less manner.

4. The method according to claim 1, wherein the secure element generates the verification code in the following manner: using a secret key shared by a secure authentication unit and the secure element to conduct an encrypting operation on the authentication information for one or more times, wherein the number of times of the encrypting operation has a correspondence to the count values of counters in the secure authentication unit and the secure element; and the mobile device verifies the verification code in the following manner: using the shared secret key to conduct a decrypting operation on the verification code for one or more times and determine whether the decrypted result matches with the authentication information, wherein the number of times of the decrypting operation is the same as the number of times of the encrypting operation.

5. The method according to claim 1, wherein the secure element generates the verification code in the following manner: using the secret key shared by a secure authentication unit and the secure element to conduct the encrypting operation on the authentication information for one or more times, wherein the number of times of the encrypting operation has a correspondence to the count values of counters in the secure authentication unit and the secure element; and the mobile device verifies the verification code in the following manner: using the shared secret key to conduct the encrypting operation on the authentication information in the same manner as the secure element, and determining whether the encrypted result matches with the verification code.

6. The method according to claim 1, wherein the configuration information comprises the identifier, the capacity of the secure element, display icon and in-built application list.

7. A method of establishing communication connection between a mobile device and a secure element, characterized by comprising the following steps:

when the mobile device establishes a physical connection with the secure element, the mobile device and the secure element perform secure authentications with each other;

if both the secure authentications are passed, the mobile device determines whether there is configuration information inside it which is required for establishing the communication connection between the mobile device and the secure element; and if there is the required configuration information inside the mobile device, the mobile device uses the configuration information to establish the communication connection with the secure element; otherwise, the mobile device obtains the required configuration information from the secure element to establish the communication connection with the secure element;

wherein the mobile device and the secure element perform secure authentications with each other in the following manner:

the mobile device and the secure element sending randomly generated authentication information to each other;

determining whether the secure authentications are passed by verifying a verification code received from each other;

wherein the mobile device and the secure element generate corresponding verification codes according to respective received authentication information.

8. The method according to claim 7, wherein either one of the mobile device and the secure element generates the verification codes in the following manner: using a secret key shared by the secure authentication unit and the secure element to conduct an encrypting operation on the authentication information sent from the other one of the mobile device and the secure element for one or more times, wherein the number of times of the encrypting operation has a correspondence to the count values of counters in the secure authentication unit and the secure element, and either one of the mobile device and the secure element verifies the received verification codes in the following manner: using the shared secret key to conduct a decrypting operation on the verification code received from the other one of the mobile device and the secure element for one or more times and determine whether the decrypted result matches with the authentication information sent to said other one, wherein the number of times of the decrypting operation is the same as the number of times of the encrypting operation conducted on the verification code by said other one.

9. The method according to claim 7, wherein either one of the mobile device and the secure element generates the verification codes in the following manner: using the secret key shared by the secure authentication unit and the secure element to conduct the encrypting operation on the authentication information sent from the other one of the secure authentication unit and the secure element for one or more times, wherein the number of times of the encrypting operation has a correspondence to the count values of counters in the secure authentication unit and the secure element; and either one of the mobile device and the secure element verifies the received verification codes in the following manner: using the shared secret key to conduct the encrypting operation on the authentication information sent to the other one of the mobile device and the secure element in the same manner as said other one, and determining whether the encrypted result matches with the verification code received from said other one.

10. A mobile device characterized by comprising:
a hardware processor and a memory, the hardware processor comprising:
a control unit configured to establish communication connection with an secure element using configuration information of the secure element;

a secure authentication unit coupled with the control unit and configured to perform secure authentication on the secure element which has established a physical connection with the mobile device, according to an instruction from the control unit; and a secure element registering machine coupled with the control unit and configured to, for the secure element which has passed the secure authentication, determine whether configuration information required for establishing the communication connection with the secure element already exists in the secure element registering machine, according to an instruction from the control unit; and if the configuration information exists, the configuration information is provided to the control unit, and if not, the configuration information provided by the secure element is stored;

wherein the secure authentication unit performs the secure authentication on the secure element in the following manner:

sending randomly generated authentication information to the secure element; and determining whether the secure authentication passes by verifying a verification code received from the secure element, wherein the verification code is generated according to the authentication information.

11. The mobile device according to claim 10, wherein the secure element is an intelligent card or a USB encryption lock.

12. The mobile device according to claim 10, wherein the mobile device comprises a wireless communication interface so as to establish physical connection with the secure element.

13. The mobile device according to claim 10, wherein the secure element generates the verification code in the following manner: using a secret key shared by the secure authentication unit and the secure element to conduct an encrypting operation on the authentication information for one or more times, wherein the number of times of the encrypting operation has a correspondence to the count values of counters in the secure authentication unit and the secure element; and the secure authentication unit verifies the verification code in the following manner:

using the shared secret key to conduct a decrypting operation on the verification code for one or more times and determine whether the decrypted result matches with the authentication information, wherein the number of times of the decrypting operation is the same as the number of times of the encrypting operation.

14. The mobile device according to claim 10, wherein the secure element generates the verification code in the following manner: using the secret key shared by the secure authentication unit and the secure element to conduct the encrypting operation on the authentication information for one or more times, wherein the number of times of the encrypting operation has a correspondence to the count values of counters in the secure authentication unit and the secure element; and the mobile device verifies the verification code in the following manner: using the shared secret key to conduct the encrypting operation on the authentication information in the same manner as the secure element, and determining whether the encrypted result matches with the verification code.

* * * * *